United States Patent [19]

Rossmann

[11] 4,319,824
[45] Mar. 16, 1982

[54] REBOUND DAMPING MEANS FOR FAST-CLOSING PHOTOGRAPHIC DIAPHRAGMS

[75] Inventor: Dieter Rossmann, Aalen, Fed. Rep. of Germany

[73] Assignee: Carl Zeiss-Stiftung, Oberkochen, Fed. Rep. of Germany

[21] Appl. No.: 205,918

[22] Filed: Nov. 12, 1980

[30] Foreign Application Priority Data

Nov. 29, 1979 [DE] Fed. Rep. of Germany ....... 2948066

[51] Int. Cl.³ .............................................. G03B 9/07
[52] U.S. Cl. .................................................. 354/272
[58] Field of Search ............... 354/270, 272, 273, 274, 354/232, 230, 231, 228

[56] References Cited

U.S. PATENT DOCUMENTS 3,687,047 8/1972 Ito ...................................... 354/274
3,864,714 2/1975 Sasaki ................................. 354/272

FOREIGN PATENT DOCUMENTS 1117884 6/1968 United Kingdom ................ 354/274

*Primary Examiner*—Donald A. Griffin

*Attorney, Agent, or Firm*—Stonebraker, Shepard & Stephens

[57] ABSTRACT

A diaphragm for photographic cameras and the like, of the type where the diaphragm closes down rapidly from a wide open aperture for viewing to a preselected smaller aperture for picture taking, immediately prior to the actual exposure. The usual slotted ring connected to the diaphragm leaves or blades is stopped in its running down movement by contact with an interception ring whose position is determined by a diaphragm presetting member, the contact between the interception ring and the presetting member including a resiliently displaceable ball. As the slotted ring runs down, it is stopped by impact with the interception ring, which absorbs some of the kinetic energy of the slotted ring, and the resiliently mounted ball connection with the position determining lever (stationary at this time) allows the interception ring to move slightly further beyond the position to which it has been preset, thus bringing the moving parts to a smooth cushioned stop and effectively damping any rebound or bounce which might otherwise occur as a result of quickly stopping the fast running down movement of the diaphragm.

8 Claims, 2 Drawing Figures

REBOUND DAMPING MEANS FOR FAST-CLOSING PHOTOGRAPHIC DIAPHRAGMS

BACKGROUND OF THE INVENTION

The present invention relates to rebound damping means for magnetically or electromagnetically actuated instant-return diaphragms of photographic cameras or the like.

In such diaphragms of the iris type, a slotted ring which normally holds the diaphragm blades open travels at high speed, shortly before the exposure, against a stop which can be adjusted in accordance with the aperture selected on a selection ring. The stop, which is generally controlled via a cam ring, determines the position of the slotted ring and thus the size of the effective aperture set during the exposure.

In order to achieve rapid successions of pictures, and in order to keep as short as possible the time between the diaphragm open position, when generally the light falling into the lens is measured for the determination of the exposure time, and diaphragm set position, during which no correction of the exposure time can be effected any longer, ever more rapidly closing diaphragm mechanisms are required. As a result, it becomes increasingly difficult to take up the high amount of kinetic energy of the diaphragm control mechanism upon impact against the stop.

In the known instant-return diaphragm constructions the slotted ring comes against a fixed stop which lies on the cam controlling said ring, which leads to undesired rebound effects. During the rebound the size of the diaphragm aperture is not precisely defined; the rebound time therefore increases the closing time of the instant return diaphragm.

West German unexamined patent application No. OS 2530392 describes a rebound damping mechanism in which contacting parts of the slotted ring and of the stop consist of magnetic material and thus adhere to each other upon impact. In this way, to be sure, rebound is avoided but a relatively large amount of force is required in order to separate the two parts for the next operation.

SUMMARY OF THE INVENTION

The object of the invention is to provide a rapidly and reliably operating rebound damping means for instant-return diaphragms which precisely reproduces the aperture value which has been selected.

This object is achieved in accordance with the invention in the manner that the stop is part of an interception ring which is mounted for rotation parallel to the slotted ring and rests via a resilient damped reset element against the cam.

The advantage of the invention includes the fact that, with suitable dimensioning of the interception ring, it takes up the entire angular momentum of the slotted ring and of the entire diaphragm mechanism which is moved upon the closing of the diaphragm, so that the mechanism comes to rest rapidly and without rebound. The angular momentum of the interception ring can then be transmitted by a suitable damping means to the housing without the damping itself affecting the position of the aperture. Before the spring, which is practically completely relaxed in the critical range of small apertures and by which the slotted ring is generally applied against the stop, can place the slotted ring again in a movement following the decelerating stop, the latter has already returned into the position of rest defined by the cam and the reset element.

For the process described it is advisable for the slotted ring and interception ring to have substantially the same moment of inertia so as to make complete transfer of the angular momentum to the interception ring possible. It is also advantageous to effect the deceleration of the interception ring and its subsequent resetting by means of a ball which is mounted in the interception ring under spring action perpendicular to the direction of movement of the interception ring, said ball resting eccentrically against a lever which is displaceable by the cam. In this way a deceleration of the interception ring over the smallest possible path without rebound is possible. The kinetic energy of the ring is taken up by the ball which moves away under spring action perpendicular to the direction of rotation and is therefore destroyed in a direction which does not affect the movement of the diaphragm. Upon return into the position of rest, the initial position of the interception ring is restored again by the ball.

BRIEF DESCRIPTION OF THE DRAWINGS

One embodiment of the present invention will be explained in further detail with reference to the accompanying drawing, in which.

DESCRIPTION OF THE PREFERRED EMBODIMENT

Figure 1:
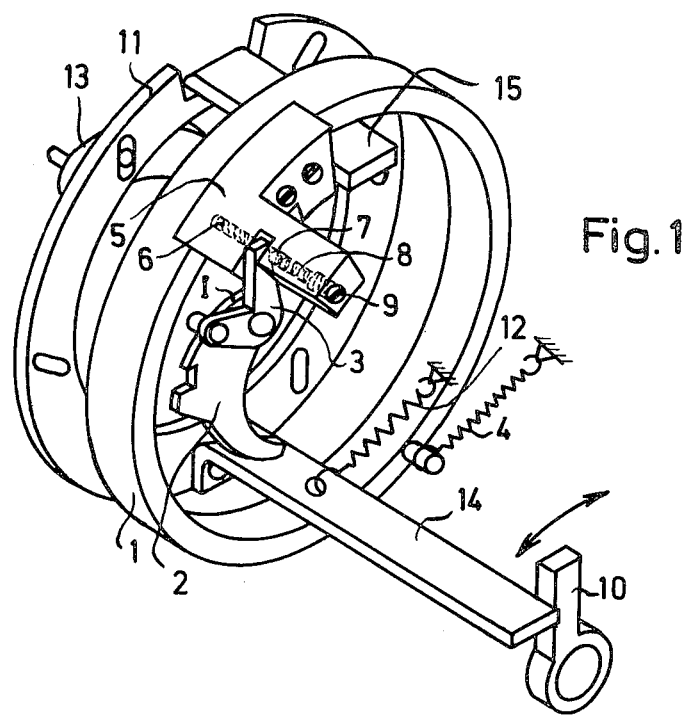
FIG. 1 shows the mechanical construction of the essential parts of a rebound-damped diaphragm.

In FIG. 1, a conventional slotted ring 11 in order to control the movement of the diaphragm leaves or blades 13 bears a control finger 14 intended for engagement into the body of a camera on which the diaphragm is mounted. The diaphragm is usually built into the interchangeable lens assembly or objective. The control finger 14 and the slotted ring 11 are urged in the direction in which the diaphragm is closed by means of the spring 12.

An interception ring 1 is turnably supported around the same axis as the slotted ring 11 (customarily this is the optical axis of the associated lens) and bears an abutment part 5 against which a finger 15 connected with the slotted ring 11 can travel upon the closing of the diaphragm by the swinging away of the camera lever 10.

A cam ring 2 is coupled for rotation to an aperture selection ring (not shown in detail) and, via a lever 3 resting against the cam I, determines the position of the abutment part 5 which is urged by the spring 4 against the cam I and thus determines the aperture to be set.

Figure 2:
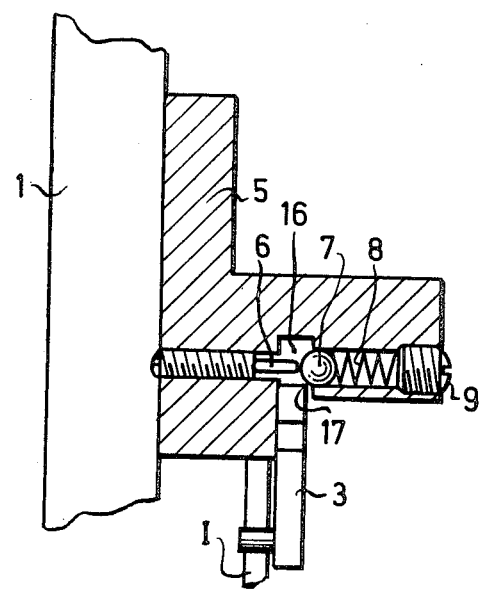
FIG. 2 shows a part of the interception ring of FIG. 1.

As shown in FIG. 2, the fork-shaped or bifurcated abutment part 5 has on one side a borehole in which a ball 7 is mounted under spring action. The force of the spring 8 can be adjusted by means of a screw 9.

On the opposite side of the fork opening or slot 16 in the member 5 from the borehole containing the ball 7 is another bore containing a member 6, part of which is screw threaded into its bore and part of which is a pin which projects into the slot 17 as illustrated in FIG. 2. This pin has a diameter which is less than that of the ball 7, and it serves here as a stop in such a manner that the ball 7 extends somewhat into the fork opening 16 of the abutment part 5.

During the exposure, i.e. with the instant-return diaphragm released, the abutment part 5 rests via the ball 7 against the edge 17 (FIG. 2) of the displaceable lever 3 which extends into the fork opening 16.

When the finger 15 comes against the abutment part 5 the movement of the slotted ring 11 is stopped, the ring 1 together with the abutment part 15 moves in a direction towards the lever 3 which pushes the ball 7 back into its bore against the pressure of the spring 8 until the ring 1, braked, comes to rest by means of the pin 6 against the lever 3.

The spring 8 which is adjustable in the support part 5 by a screw 9 places the ball 7 back against the pin 6 after the ball has given off its kinetic energy to its guide, and it thus restores the starting position of the support part 5 with respect to the lever 3.

What is claimed is:

1. Rebound damping means for instant-return diaphragms comprising a slotted ring (11) mounted for rotation to adjust the aperture of the diaphragm, an interception ring (1) mounted for rotation substantially parallel to said slotted ring, a stop (5) on said interception ring for limiting rotary movement of said slotted ring in one direction, a cam for controlling a selected diaphragm aperture, and cooperating parts associated with said cam and said interception ring for limiting the extent to which said interception ring may rotate in said one direction, said cooperating parts including a lever (3) the position of which is varied by said cam and a ball (7) supported from said interception ring and resiliently urged to a position resting eccentrically against said lever.

2. The invention defined in claim 1, wherein said slotted ring and said interception ring have substantially the same moment of inertia.

3. The invention defined in claim 1, further comprising spring means (4) normally maintaining said interception ring in a first limit position with said ball resting eccentrically against said lever, and wherein upon release of the diaphragm from a large aperture position to return to a predetermined smaller aperture position, said slotted ring rotates until it engages said stop on said interception ring with an impact which tends to turn said interception ring beyond its said first limit position, thereby displacing said ball to permit slight further rotation of said interception ring to a second limit position, the absorption of some of the kinetic energy of the slotted ring by the interception ring plus the displacement of the ball by the further rotation of the interception ring serving to bring the return movement of the slotted ring to a fast and smooth stop without rebound.

4. The invention defined in claim 3, wherein said slotted ring and said interception ring have substantially the same moment of inertia.

5. Photographic diaphragm mechanism comprising a first movable element (11) whose position determines the actual aperture of the diaphragm, first spring means (12) tending to move said first element in a running down movement from a maximum aperture position toward a minimum aperture position, a second movable element (1) movable substantially parallel to the movement of said first element and constituting an abutment with which said first element may make an impact contact during its running down movement to limit the extent of such running down movement, second spring means (4) tending to move said second element toward a position corresponding to a minimum aperture position of the first element, a settable element (3) adjustable to a variable position corresponding to a particular aperture size for a photographic exposure to be made, and respective contact points on said second movable element and said settable element respectively for limiting the extent to which said second spring means may move said second element, one of said contact points including a resiliently displaceable member (7).

6. The invention defined in claim 5, wherein one of said contact points is a spring pressed ball (7) movable along a bore and the other of said contact points is a member movable in a direction approximately perpendicular to said bore and normally engaging the ball eccentrically to establish a set position of said second element, said ball being resiliently displaceable to allow slight additional movement of said second element beyond its set position when said first element makes impact with said second element during the running down movement of the first element.

7. The invention defined in claim 6, wherein said ball and said member with which it makes contact are so dimensioned and arranged that after said slight additional movement of said second element, resilient action of said ball will restore said second element to its said set position.

8. The invention defined in claim 7, wherein said first element and said second element have substantially equal moments of inertia.

* * * * *